(No Model.)
J. O. HEINZE, Jr.
COMBINED DYNAMO ELECTRIC MACHINE AND WATER MOTOR.
No. 496,307.  Patented Apr. 25, 1893.
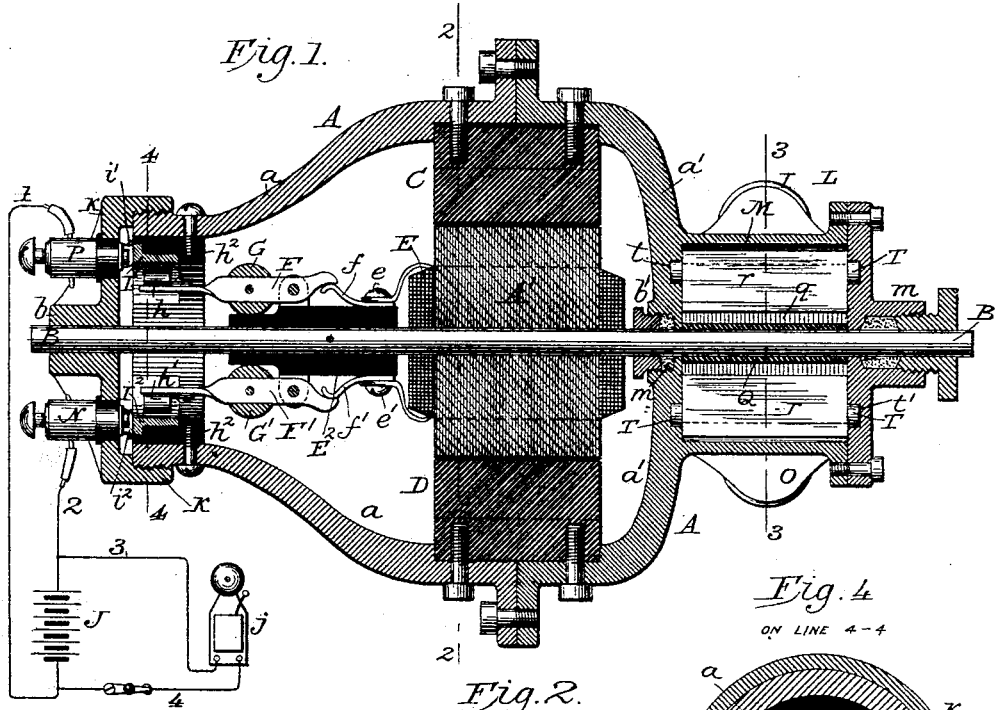
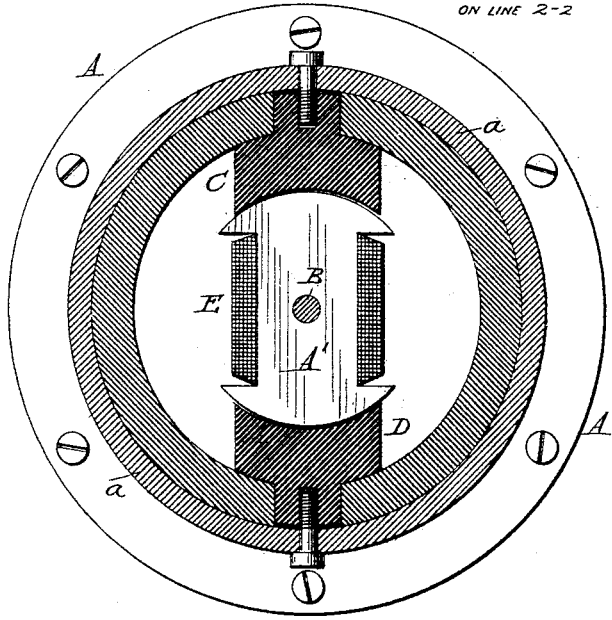
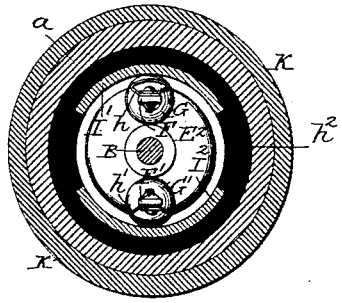
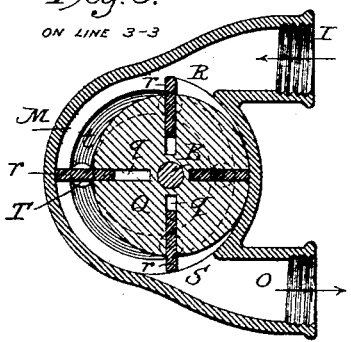
Witnesses:
Sidney P. Hollingsworth
Thos. S. Hodges
Inventor;
John O. Heinze Jr.
by his attorney,
Stephen James

UNITED STATES PATENT OFFICE.

JOHN O. HEINZE, JR., OF LYNN, MASSACHUSETTS, ASSIGNOR TO THE HEINZE ELECTRIC COMPANY, OF SAME PLACE.

COMBINED DYNAMO-ELECTRIC MACHINE AND WATER-MOTOR.

SPECIFICATION forming part of Letters Patent No. 496,307, dated April 25, 1893.

Application filed October 15, 1892. Serial No. 449,023. (No model.)

*To all whom it may concern:*

Be it known that I, JOHN O. HEINZE, Jr., a citizen of the United States, residing at Lynn, in the county of Essex and State of Massachusetts, have invented certain new and useful Improvements in a Combined Dynamo-Electric Machine and Water-Motor; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a new and improved system of operating electrical apparatus and more particularly to a combination and arrangement whereby an intermittently operated electric generator is caused to supply current to a storage battery, said battery being in circuit with a number of translating devices such as annunciators, electric bells &c., particularly such as are employed in a house or hotel. A large amount of power is wasted in the flow of water through the principal supply pipes of dwellings and hotels, especially where, as is the case in many cities, the pressure is quite considerable. With a view to utilizing this wasted force I have arranged and combined an electric generator and water motor, a centrifugal cut-out and the necessary connections to enable me to generate and collect electric current by means of the movement of water in supply pipes, such current being accumulated in a suitable storage battery for subsequent use. The supply of power would ordinarily be intermittent and usually of short duration. I therefore prefer to employ a magneto electric generator in combination with a centrifugal switch which will only close the circuit of the generator after the armature speed has reached a sufficient height to prevent current passing back into the generator and its being operated as a motor thereby.

The invention will be more fully set forth in the following description, aided by the accompanying drawings in which:

Figure 1 is a vertical sectional elevation showing an arrangement of apparatus embodying my invention. Fig. 2 is a transverse end section on the line 2—2 of Fig. 1. Fig. 3 is a transverse sectional elevation of the water motor. Fig. 4 is a transverse sectional elevation on the line 4—4 of Fig. 1, showing the centrifugal switches.

In the drawings: A is an exterior inclosing shell, comprising a front part $a$ and a rear part $a'$.

B is the armature shaft which passes axially through the shell and is provided with bearings $b\ b'$ at each end thereof. An armature A' is mounted upon the shaft B in the widest part of the shell A and said armature is provided on opposite sides with field-magnets C D which are preferably made of steel and permanently magnetized. The armature A' is preferably of simple construction being provided with a single large coil of insulated conductor E, the terminals of which are brought out and secured to clamp screws $e\ e'$, to each of which is connected a resilient contact piece or spring $f\ f'$. A pair of hinged arms F F' are sustained in position to be moved into or out of contact with the springs $f\ f'$ by means of weights G G' secured to said arms which carry at their other ends the contacts $h\ h'$. The screws $e\ e'$, springs $f\ f'$, hinged arms F F' and weights G G' are all either secured upon or normally sustained upon a sleeve of insulating material $E^2$, secured upon the armature shaft B.

A suitable disk of insulating material $h^2$ is secured to the shell A and this disk carries upon its interior periphery the two metallic segments I' $I^2$ which are engaged by the contacts $h\ h'$ when the weights are thrown outward by the proper speed of the armature shaft, thus closing the armature circuit and supplying current to the storage battery. The weights G G' are normally held against the sleeve $E^2$ by the springs $f\ f'$, which hold out the inner ends of the arms F F' when their free ends carrying contacts $h\ h'$ will be held toward the shaft B, and out of contact with segments I' $I^2$ opening the armature circuit. The spaces between the commutator segments I' $I^2$ are filled in with insulating material and upon each segment rests one of the conductor brushes $i\ i^2$ which are connected respectively with two binding posts P N, from whence current is carried by conductors 1 and 2 to a storage battery J, from whence it can be taken for use as desired through a circuit 3—4, in which appears in conventional form an electric bell $j$, but it is to be understood that any other form of apparatus or translating device or any arrangements of circuits may be connected with the generator without in any way affecting the invention.

It is intended to close the openings into the shell A to prevent the ingress of moisture from any source since an apparatus of this kind might frequently be most desirably placed where the conditions would be very unfavorable to an exposed machine. The binding posts P N and the contact springs $i\ i^2$ are therefore desirably carried upon a removable cap K which is easily applied and can be readily removed for the inspection of the contact devices.

Power is supplied to the armature shaft by a convenient form of water motor which, as indicated at L, is located at the opposite end of the casing A and secured to or made a part thereof, where a suitable cylindrical chamber M is shown through which the armature shaft passes, entering and leaving the same through suitable stuffing boxes $m\ m$.

As indicated in Fig. 3, inlet and outlet water connections I O are provided which communicate with the chamber M through horizontal ports R S placed substantially opposite each other.

The moving part or wheel of the water motor L comprises a cylindrical metallic block Q which is securely mounted upon the armature shaft B, said shaft passing through the chamber M on a line eccentric to the axis thereof so that the wheel Q is eccentrically mounted within the chamber M. The wheel Q is provided with any desired number of radial slots $q$, four being shown. Radially sliding plates or buckets $r$ are fitted so as to slide freely in and out of the slots $q$. The buckets should extend the full length of the chamber. Each bucket is provided at each end with a short boss, T. At each end of the chamber is formed a circular groove $t\ t'$ which grooves are at the same distance from the walls of the chamber M throughout. The bosses on the ends of the buckets engage and travel in the grooves $t\ t'$ so that they will be moved in and out of the wheel Q as the same is rotated by the force of the water entering through inlet I and escaping through the opposite port O.

It will be observed that the ports are placed on opposite sides of the greatest space existing between the rotating wheel Q and the stationary chamber M. Consequently the buckets will be thrown out from the wheel to engage the walls of the chamber and will be drawn in to enable them to pass the space where the wheel and the walls of the chamber are brought into contact with each other.

My invention as a whole forms a new and compact device which can be readily applied to any water-pipe by an ordinary plumber or steam fitter. The device would work admirably with a constant supply of water, but it is particularly arranged to produce useful results from an intermittent supply, the surplus power of which would otherwise be wasted.

The details of arrangement and construction may be modified in various ways without departing from the invention. I therefore, do not limit myself to the various details set forth.

Having described my invention, what I claim, and desire to secure by Letters Patent, is—

1. In combination, an intermittently actuated motor, an electric generator driven directly thereby, a commutator for the armature, a water proof metallic casing inclosing the motor and generator and supporting the bearings thereof, and a detachable part carrying the commutator brushes and circuit connections.

2. In combination, an intermittently actuated water-motor, an electric generator operated directly thereby, a commutator for the armature, a watertight casing inclosing the watermotor and generator and a detachable part inclosing and protecting the commutator and carrying brushes engaging the same and contacts extending to the outside of the generator.

3. In combination, an intermittently actuated water motor an electric generator intermittently actuated thereby, a commutator for straightening the currents produced by the generator, a centrifugal switch for closing the armature circuit upon the commutator at the desired speed, water connections for operating the motor, electrical connections for receiving the current from the generator and a storage battery for receiving said current, and watertight casings inclosing the motor and generator.

4. In combination, an intermittently actuated water motor, a generator driven intermittently thereby, a commutator and a centrifugal switch for closing the armature circuit upon said commutator at the desired speed, all inclosed within a watertight casing, inlet and outlet connections for the motor, and detachable commutator brushes, and connections for the generator.

5. The combination of a metallic shell or casing formed with two compartments, an armature shaft extending through both compartments and supported in suitable bearings in the shell, a water-motor upon one part of the armature shaft and in one compartment of the casing and a magneto-electric generator in the other part of the casing and detachable connections for conveying the current away from the inclosed generator.

In testimony whereof I affix my signature in presence of two witnesses.

JOHN O. HEINZE, JR.

Witnesses:
STEPHEN JANNUS,
FRANKLAND JANNUS.